United States Patent [19]
Schloss

[11] 3,929,410
[45] Dec. 30, 1975

[54] ANALYTICAL PROCESS

[76] Inventor: Benjamin Schloss, 179 Sundridge Drive, North Tonawanda, N.Y. 14120

[22] Filed: Oct. 9, 1973

[21] Appl. No.: 404,695

Related U.S. Application Data

[63] Continuation-in-part of Ser. No. 87,865, Nov. 9, 1970, abandoned.

[52] U.S. Cl............. 23/230 R; 23/230 B; 250/303; 424/1
[51] Int. Cl.² ......................................... G01N 33/16
[58] Field of Search ........... 23/230 R, 230 B; 424/1; 250/303

[56] References Cited
UNITED STATES PATENTS

| | | | |
|---|---|---|---|
| 3,451,777 | 6/1969 | Di Giulio............................ | 23/230 B |
| 3,659,104 | 4/1972 | Gross et al. ....................... | 23/230 B |
| 3,666,854 | 5/1972 | Eisentraut......................... | 23/230 B |
| 3,743,482 | 7/1973 | Eisentraut......................... | 23/230 B |
| 3,745,211 | 7/1973 | Brown et al....................... | 23/230 B |
| 3,768,979 | 10/1973 | Mead et al. ...................... | 23/230 B |
| 3,773,467 | 11/1973 | Yang et al......................... | 23/230 B |

*Primary Examiner*—R. E. Serwin

[57] ABSTRACT

Method of quantitative analysis of a chemical substance which exists in two different forms, for example, a radioactive and a normal (non-radioactive) state. The method can be illustrated as follows: form a saturated solution of a known amount, Y, of a radioactive substance, measure the level of initial radioactivity, $R_i$, bring into contact with the saturated solution an unknown amount, X, of the normal substance, in a different immiscible phase, permit the radioactive and normal substances to exchange freely between the two phases until equilibrium is reached, separate the two phases, and measure the radioactivity, $R_f$, of the remaining saturated liquid solution. The amount of the normal substance can then be determined according to the formula $$X = Y \left( \frac{R_i}{R_f} - 1 \right)$$

13 Claims, 2 Drawing Figures

CALIBRATION FOR TPI METHOD

ERROR CURVE FOR TPI METHOD

Curve 1
Curve 2

3,929,410

ANALYTICAL PROCESS

CROSS-REFERENCE

This application is a continuation in part of my patent application Ser. No. 87,865, now abandoned, filed Nov. 9, 1970.

BACKGROUND OF THE INVENTION

The determination of the amount of a particular substance in a sample which may contain other substances, is the task of quantitative analysis.

Most analytical methods, particularly those used for the analysis of organic compounds, depend on a chemical interaction(s) with a functional group in the compound, C, that yields in one or more steps a product, D, whose amount can then be determined by its light absorption at a particular wave length. If the amount of light absorption is strictly proportional to the amount of D and the amount of D is strictly proportional to the amount of C, then the amount of C is readily determined from the measurement of the light absorption.

A variety of other physical interactions with D are also used. For example, D may produce a change in the pH of a solution; or it may precipitate and be separated and weighed; or it may fluoresce, etc.

The reason for introducing a chemical reaction step rather than making some physical measurement directly on C, is that other substances may be in the sample which may interfere with the physical measurement. The essential criterion for the chemical step(s) is therefore that it act exclusively on substance C. This criterion may be difficult to meet since organic compounds with similar functional groups have similar chemical interactions. E.g. the alcohols whose functional group is OH vary according to the nature of the rest of the molecule, R, which is attached to the OH, e.g., R. may stand for $CH_3$, $C_2H_5$, $C_3H_7$. Hence a sample containing a mixture of alcohols may give a mixture of D type products all of which may also produce some light absorption at the same wave length used to measure the D derived from C.

During the past two to three decades, various methods for solving this problem have been developed. These are all basically methods which attempt to separate C from all other substances in the sample. The most widely used are the chromatographic methods. After separation, C is measured directly by some physical method, e.g. refractive index, or indirectly as described above, i.e. by performing a chemical reaction and measuring a physical property of the product, D.

The introduction of radioactive tracers made repeated recrystallizations for the separation of C a practical procedure, for the effectiveness of the separation could be followed by noting the increasing specific activity of the radioactive precipitate; complete separation from all other substances in the sample is assumed when constant, maximum specific activity is obtained. Since the specific activity of the added radioactive form of C is known and the radioactivity of the purified precipitate can be measured, the original amount of C can be calculated. This is known as the isotope dilution method. It is basically a variation of the general method of isolation, followed by physical measurement.

Finally, there are the new radioimmunological methods for immunopotent substances, such as proteins. These methods depend upon a very specific separation procedure, the antigenantibody interaction. The use of radioactive antibodies for forming a readily separated antigen-antibody precipitate is an extremely sensitive application of the method of separation and physical measurement.

All of the methods described above have one or more disadvantages. The chemical interaction methods are of uncertain specificity, the prior separation methods frequently have technical problems and may be tedious and may fail to give perfect separations. The radioimmunological methods have a very limited application, although where they can be used, they give excellent specificity and sensitivity.

SUMMARY OF THE INVENTION

The purpose of this invention is to develop a universal analytical method, i.e. a method which theoretically can be applied to the quantitative determination of any element or compound in any type of sample, gaseous, liquid or solid, containing any type of mixture of substances. Further purposes are to achieve reliable specificity, procedural simplicity, speed and great sensitivity with this universal method.

A solution to the problems of universality and specificity would be obtained, if the method utilized an interaction with the entire molecular or atomic pattern, not just a functional group, since it is only the overall electromagnetic spatial configuration which uniquely characterizes every element and compound. If, therefore, an interaction is used which depends only on this configuration rather than the configuration of a functional group, then the interaction can be specific and free from interference from other closely related substances.

Examples of such an interaction are the interactions between like molecules and like atoms, as occurs in crystal formation or the dissolving of crystals. These types of interaction can be exploited in various ways.

Two different methods are described to illustrate the principle. The methods are applied to determining pure cholesterol and free and total cholesterol in human serum.

With respect to the combination of features that an analytical method should possess, namely, accuracy, specificity, reproducibility, sensitivity, broad range, speed, simplicity, low cost, ease of automation and universality of application, the TPI methods, particularly method II, as described below, appear to have marked advantages over other current methods. The methods of this invention can be summarized as follows.

Mix homogeneously a known amount, Y, of form A, of a substance, which amount is just sufficient to saturate a specific volume of a phase I medium, at a saturation temperature, $T_s$, with an unknown amount, X, of a form B of the same substance and divide the amounts X + Y between two phases, phase I and phase II, which is immiscible with phase I, so that at $T_s$, phase I contains the amount Y of forms A and B. If the initial radioactivity of Y amount of A is $R_i$, and the final radioactivity of A in phase I is $R_f$, then Y being known by preparation, X may be calculated from the equation $$X = Y \left( \frac{R_i}{R_f} - 1 \right)$$

If Y of A and X of B are dissolved in phase I (a liquid) by raising the temperature sufficiently thereby achieving homogeneous mixing of A and B, then by lowering the temperature sufficiently below $T_s$, thereby precipitating out a solid (phase II) then raising the temperature to $T_s$ to dissolve the amount Y, and measuring $R_f$ in an aliquot of phase I, X can be calculated from the above equation.

Alternatively, if Y of A and X of B are dissolved in a volatile liquid, thereby homogeneously mixing A + B, and the liquid is removed by evaporation leaving a solid phase II containing X + Y, then by adding phase I (a liquid) and holding the temperature at $T_s$ until phase I saturates with Y amount of the substance and counting an aliquot of phase I to determine $R_f$, then X can be calculated from the above equation.

DETAILED DESCRIPTION OF THE INVENTION

Method I. Obtain a substance in two forms that are configurationally identical but differ with respect to some internal physical characteristic. Start with a known amount, Y, of one form A of the substance, that will saturate a carrier phase I, for example, a liquid at a specific temperature, $T_s$. Homogeneously mix the foregoing solution at a temperature sufficiently greater than $T_s$, with an unknown amount X, of the same substance in form B, so that all of X and Y are dissolved. After mixing, lower the temperature enough to cause the separation of a phase II which now contains A + B in the same proportions as in phase I. Raise the temperature to $T_s$. In the final solution there will be a decrease in the amount of form A in phase I related to the amount of B that had been mixed with A. Separate phases I and II and measure the amount of A in phase I. If form A is radioactive and form B is non-radioactive, then X can be calculated from equation 1:

(1) $$X = Y \left(\frac{R_i}{R_f} - 1\right)$$

where

Y = amount of form A initially added to phase I
$R_i$ = amount of radioactivity initially in phase I before mixing with X
$R_f$ = amount of radioactivity in phase I after equilibra with phase II
$R_i$ and $R_f$ are usually measured from aliquots of material from phase I.

I call this analytical method the two phase interchange (TPI) method of analysis, and the phase I solution is the TPI reagent. This equation is readily derived as follows:

At equilibrium, $$\frac{A_{II} + B_{II}}{A_{II}} = \frac{A_I + B_I}{A_I}$$

where $A_{II}$ and $B_{II}$ are amounts of A and B in phase II, and $A_I$ and $B_I$ are amounts of A and B in phase I
but $A_{II} + B_{II} = B_{Total} = X$
and $$A_I + B_I = A_{Total} = Y = \frac{R_i}{SA},$$

where $SA$ = specific activity (amount of radioactivity per unit weight) of form A therefore $X = Y \dfrac{A_{II}}{A_I}$ but $A_{II} = Y - A_I$ and $A_I = \dfrac{R_f}{SA}$ therefore $X = Y \dfrac{\left(\dfrac{R_i}{SA} - \dfrac{R_f}{SA}\right)}{\dfrac{R_f}{SA}} = Y \left(\dfrac{R_i}{R_f} - 1\right)$ Note that $R_i$ and $R_f$ need not be obtained by radioactive measurements. They can be the measured values for various other types of interaction that can be made with form A but not with form B. The radioactivity can be derived from various types of atoms, e.g. a compound can have its hydrogens replaced by tritium or its carbon atoms replaced by carbon 14. Alternatively, stable isotopes, e.g. carbon 13 or deuterium can be used and analysis made with a mass spectrometer. There is also the possibility of forming compounds with para hydrogen for form A, which can be measured by magnetic methods for nuclear spin.

Figure 1:
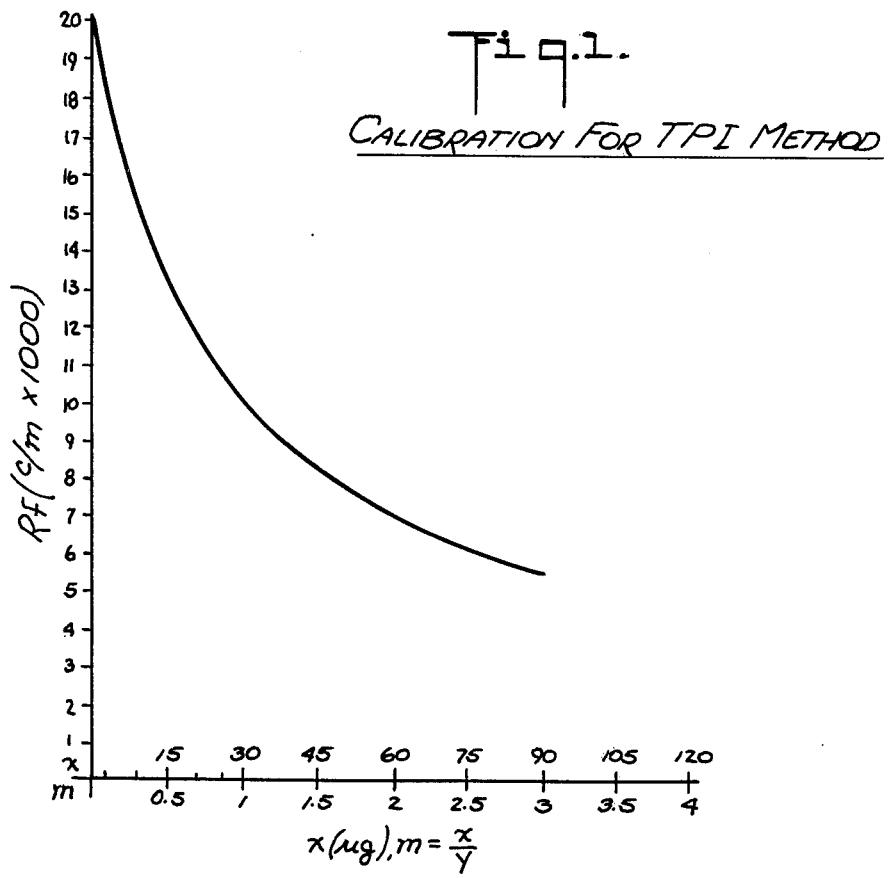
FIG. 1 is a calibration curve for the method of this invention.

FIG. 1 shows a calibration curve for TPI method, which was obtained with radioactive cholesterol, form A and normal cholesterol, form B. The amount of $A = Y$, and the amount of $B = X$. The curve follows the theoretical equation $$X = Y \left(\frac{R_i}{R_f} - 1\right),$$

$R_i$ = 20,000 c/m. From a measurement of $R_f$ the amount X or the ratio of X/Y can be determined.

Figure 2:
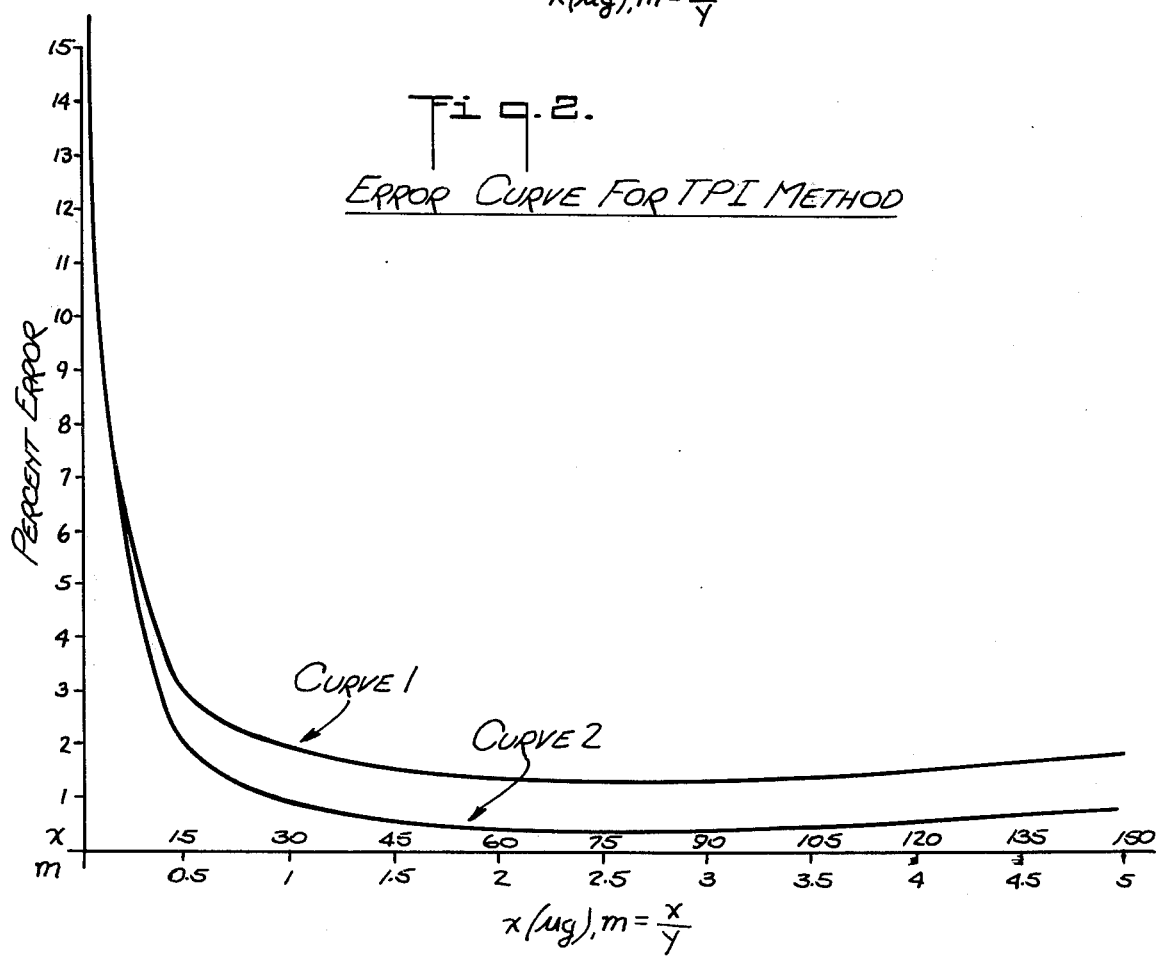
FIG. 2 is an error curve for the method of this invention.

FIG. 2 shows an error curve for TPI method. The conditions are:

1. A saturated solution of A (radioactive) is equilibrated with a non-radioactive form B of the same substance. The amount of $B = X$ and the amount of $A = Y$, then $$X = Y \left(\frac{R_i}{R_f} - 1\right)$$

where $R_i$ = radioactivity of the saturated solution before equilibration with X,
$R_f$ = radioactivity of the saturated solution after equilibration with X.

2. The error curve was obtained by the equation:

$$\% \text{ error} = \frac{X' - X}{X} \times 100$$

where $X' = Y \left(\dfrac{R_i}{R_f - \sqrt{R_f}} - 1\right)$ and $\sqrt{R_f} = \delta R_f$ therefore approximately the smallest change in $R_f$ that can be measured.

3. $Y = 30$ μg, $R_i = 20,000$ c/m for curve 1 - for curve 2, $R_i = 100,000$ c/m.

The following is an application of the method (method I) in which phase I is a liquid solution of a radioactive substance which is equilibrated with a solid phase II.

The conditions for method I are:

1. Homogeneous mixing of A and B in phase I — Phase I liquid must have a sufficiently high temperature coefficient so that relatively small temperature elevations will suffice to dissolve Y and amounts $X = 2Y$ or greater. The elevated temperature must be well below the decomposition temperature of the substance.

2. Separation of phase II — Since spontaneous crystalization occurs only in supersaturated solutions, there will be an excess of solid formed. This excess is rapidly redissolved by bringing the mixture to the saturation temperature, $T_s$.

3. Obtaining a sample for measuring $R_f$ — Various methods can be employed for separating phase II from phase I, so that a sample can be taken from phase I for counting. Filtration is rapid and simple. With very dilute solutions many types of filters absorb a measurable amount of substance. A filter with very low absorption is the Nuclipore filter (made by General Electric Company) which is available with pore sizes from $0.1$ μ and up. Coarse crystals can be separated by centrifugation. However crystals formed in very dilute solutions are too small for rapid separation by centrifugation.

4. Crystallization — Crystallization from supersaturated concentrated solutions can be very rapid (fraction of a second). However from very dilute solutions even with considerable supersaturation, it may take hours or it may be impossible to produce visible crystals. There are important advantages in working with very dilute solutions. A practical compromise can be found between speed and dilution.

Crystal size is also determined by concentration, the more dilute the solution the smaller the crystals. Since $T_s$ varies with crystal size (very small crystals $2\mu$ or less have larger solubilities) conditions for crystallization must be chosen that give a constant $T_s$ for an adequate range of concentrations.

5. Counting method — Tritium or carbon 14 are the radioisotopes most frequently used in organic compounds. Tritium compounds are cheaper and are available in much higher specific activities. To count these isotopes, liquid scintillation counters are generally used. However, the equipment is costly and bulky and sample preparation material can run as high as 20 cents to 30 cents per sample. I chose therefore to count with a windowless geiger flow counter which accepts a cupped planchet in which the radioactive sample has been evaporated. There is no cost per counting sample and the geiger tube is small and inexpensive, as is also the associated electronics. However there is a difficult problem to overcome, namely how to do planchet counting yet avoid self-absorption losses, since the beta rays from tritium are so weak (approximately 10,000 ev maximum) very small amounts of solid on the planchet will absorb an appreciable amount of the radiation. Another problem is counting variation due to variation in sample distribution on the planchet. The problems were solved by using counting samples containing 1 μg of solid or less and centering the sample by designing a special planchet. A standard 1 × 5/16 inch cup planchet is given an approximately flat depression at its center. The depression is 1.5mm deep and the diameter is 12 mm. This can hold a 50 λ liquid sample. Any irregularity in distribution of the evaporated liquid sample is insignificant as evidenced by the fact that the average deviation for 16 trials was ± 0.32% (average count approximately 20,000 counts). Note: greater than 50% counting efficiency is obtained.

6. Sensitivity — Sensitivity is determined by the specific activity of form A and by the concentration of the saturated solution. The greater the specific activity, the smaller the amount of form A that can be detected. E.g. tritiated cholesterol is available with specific activities of 50 curies/millimole, which translates to a detection sensitivity of approximately 0.1 picogram. The sensitivity limitation is the concentration of the TPI reagent that gives a practical crystal size and a practical rate of crystallization. From equation 1, it is evident that the smaller the value of Y, the smaller the value of X that can be determined. It should be possible to reach sensitivities of approximately 50 nanograms.

7. Range — The range of the method is related to the error curve. From the error curve in FIG. 2, it is evident that a range of 0.2A to greater than 5A is possible. However the temperature coefficient of solubility may prevent dissolving amounts of X greater than 2A. Hence the practical range may be from 0.2A to 2A or 10 fold.

Illustration of the TPI method I by a cholesterol determination:

1. Transfer 50 λ of cholesterol solution containing X amount of cholesterol to a 0.5 ml glass ampoule and evaporate to dryness with an air stream. Note X can very from 6 to 60 μg.

2. Add 200 λ TPI reagent (contains 30 μg triated cholesterol, approximately 0.3 μc in a 40% isopropanol, water solution, V:V). Seal the ampoule. Place in a 150°C bath for 1 minute. Shake. Transfer to a 25°C bath for 3 minutes and then to a 43.0°C bath for 2 minutes. Filter through a 0.8 μ Nuclipore filter in a 13mm Swinny holder (made by Millipore Corp.) at approximately 35°–40°C.

3. Transfer 10 λ of the filtrate to the center well of the special 1 inch cup planchet. Evaporate to dryness (one minute) on a sample spinner. Insert in a windowless flow counter and pass geiger gas through the counter. (Gas mixture is 99.05% He, 0.95% isobutane). Count for 1 minute to determine $R_f$.

4. Determine the value of X from the curve shown in FIG. 1 (obtained by plotting $R_f$ vs. weight of cholesterol) or calculate X from equation 1.

Determination of free and total human serum cholesterol:

Add 50 λ serum to 450 λ isopropanol. Shake for one minute vigorously. Centrifuge. Evaporate 200 λ of the supernatant to dryness. Extract the residue with 200 λ methylene chloride and transfer to a 0.5 ml ampoule. Evaporate to dryness in an air stream. Continue as described in 2 to 4 above. Multiply X by 5000 to give the free cholesterol in mgs/100 ml serum.

Hydrolyze 50 λ isopropanol extract with 25 λ alcoholic KOH. Neutralize with NCl. Evaporate to dryness. Extract with 200 λ methylene chloride. Transfer to a 0.5 ml ampoule or evaporate to dryness in an air stream. Continue as described in 2 to 4 above. Multiply X by 20,000 to give the total cholesterol in mgs/100 ml serum. The method can determine total cholesterols from approximately 100 to 1200 mgs/100 ml serum.

Note: Other procedures for cholesterol determination can be devised giving greater sensitivity and speed and eliminating the evaporation step of the unknown sample. For example considerable variation in sensitivity can be obtained by varying the solvent in the TPI reagent. Thus the procedure described is illustrative of many possible procedures that can meet the conditions of the TPI method I.

Method II. If instead of starting with form A in the liquid phase, phase I, as in method I, we start with form A in the solid state, phase II, then the method becomes much simpler. Simply dissolve Y amount of A and X amount of B in a volatile solvent. Remove the solvent by evaporation, leaving a thin film of solid (phase II) containing A and B homogenously mixed, add a specific volume of liquid (phase I) which saturates with the amount Y at $T_s$ and hold the temperature at $T_s$ until phase I is saturated, then remove an aliquot of phase I without disturbing phase II and count, to determine the value of $R_f$. $R_i$ is determined independently by a dissolving Y amount of form A in a solvent and measuring the radioactivity. Equation 1 applies so that X can be calculated or determined from a calibration curve of $R_f$ vs. X as in FIG. 1.

Advantages of Method II over Method I

1. The problems of crystallization are avoided. The elimination of the crystallization step of Method I results in greater speed and greater range and sensitivity.

2. Greater sensitivity is obtained because forming crystals in dilute solutions is the limiting factor in Method I. Method II starts with a crystalline deposit and thereby avoids this problem. The sensitivity is then determined solely by the saturation concentration obtainable with a solvent. E.g. with cholesterol, water saturates with approximately 0.5 $\mu$g/ml. If one works with 50 $\lambda$, Y = 25 ng and the smallest detectable amount of cholesterol is about 1 ng. Since there is no filtration required to obtain an aliquot of phase I, filter absorption which causes a problem in method I, plays no role.

3. Greater speed is obtained because the only time consuming step is saturation of phase I. This, under proper conditions of thin solid film, temperatures of about 40°–50°C and small liquid volume, occurs in 2 or 3 minutes or less.

4. Greater range is obtained because solubility in phase I of X is irrelevant. By choosing a volatile solvent in which the substance is very soluble, X can be many times greater than Y. Further, phase I liquids can have low temperature coefficients so that the temperature need not be held very precisely at $T_s$.

5. Interference by other substances in the sample is eliminated. In method I conditions have to be carefully controlled to minimize the effect of other substances on the solubility at $T_s$ and on the rate of crystallization, as well as the crystal habit. In method II the presence of other substances can be automatically compensated for by determining the calibration curve for the sample. Thus cholesterol extracted from serum is mixed with steroids and fats as well as other substances. The solubility of cholesterol with this mixture may be different from the solubility of cholesterol in pure TPI phase I solvent. Whatever this solubility may be, it results in a calibration curve that will be constant for serum even if it differs from the calibration curve for pure cholesterol.

6. Machine construction is greatly simplified with method II. An automatic analytic machine requires only a preparation of the sample, addition to a disposable capsule containing solid TPI reagent, evaporation, addition of phase I liquid, removal of an aliquot and counting.

Cholesterol determination with method II:

1. Start with an ampoule containing Y amount of radioactive cholesterol which will just saturate 100 $\lambda$ of phase I at $T_s$.

2. Add the sample, X, in a volatile solvent which rapidly dissolves Y. Evaporate to dryness.

3. Add 100 $\lambda$ of phase I liquid and hold temperature at $T_s$ for 3 minutes. Remove an aliquot, 10 $\lambda$ for counting to obtain the value of $R_f$.

4. Determine X by equation 1 or by referring to the calibration curve of $R_f$ vs. X.

Free and total cholesterol in human serum:

Extract free and total cholesterol as described in method I. Follow steps 1 to 4 above.

The methods of this invention have been described in detail in terms of specific embodiments for an organic compound of interest in clinical chemistry. However, alternate embodiments for inorganic and other organic substances in gaseous, liquid or solid states, will be apparent to those skilled in the art, in view of this disclosure and the parameters discussed herein. Accordingly such modifications and the varied applicability of the present method are to be considered within the spirit of the invention as defined by this disclosure and the following claims.

What is claimed is:

1. A method for determining the amount of a substance in a gaseous, liquid or solid sample, that is available in two forms, form A and B, in which A and B are chemically identical but A possesses an internal property which B does not possess, so that A can be analytically distinguished from B which comprises:

equilibrating a known amount, Y, of the substance in form A with an unknown amount, X, of the substance in form B, in which Y is chosen to be precisely equal to the amount of substance required to saturate a phase I at a temperature, $T_s$, and in which X + Y is divided between two immiscible phases, phase I and phase II, and by measuring the property which distinguishes A from B to obtain an initial value $R_i$ for the amount Y, then by determining $R_f$, the value for the amount of A that is present in phase I at $T_s$ after equilibration with B and partitioning of X + Y between phases I and II and where Y amount of substance is in phase I, the amount X can be calculated from the equation $$X = Y \left( \frac{R_i}{R_f} - 1 \right)$$

or by referring to a calibration curve of $R_f$ vs. X.

2. The method of claim 1 wherein rapid homogeneous mixing of X and Y is obtained by altering the temperature of a specific volume of phase I in a direction that dissolves X and Y and forming another phase, phase II by reversing the temperature and passing beyond $T_s$, to a temperature that produces a rapid separation of phase II from phase I and returning the temperature to $T_s$ to dissolve Y amount of the substance.

3. The method of claim 1 wherein form A is a radioactive substance and form B is the normal non-radioactive form of the same substance.

4. The method of claim 1 wherein phase I is a liquid and phase II is a solid.

5. The method of claim 1 whereby X amount of form B of a substance is dissolved in a specific volume of phase I liquid containing Y amount of radioactive form A of the substance, which amount saturates a specific volume of phase I at temperature $T_s$, by raising the temperature high enough to dissolve all of X and Y, and then separating a solid, crystalline phase II from phase I by lowering the temperature sufficiently below $T_s$ to produce rapid crystallization of excess A and B, and the by raising the temperature to $T_s$ to obtain a phase I solution that contains precisely the amount Y of the substance, and then separating phase I from phase II by filtration or other means so that an aliquot of phase I uncontaminated with phase II can be taken for counting phase I's radioactivity, and then transferring this aliquot to a planchet, evaporating to dryness and counting the radioactivity in a windowless geiger flow counter to obtain the value $R_f$, and then determining the value of X from the equation $$X = Y \left(\frac{R_i}{R_f} - 1\right)$$

or from a plot of $R_f$ vs. X.

6. A method for determining the amount of a substance in a gaseous, liquid or solid sample, that is available in two forms, forms A and B, in which A and B are chemically identical, but A possesses an internal property which B does not possess, so that A can be analytically distinguished from B, and wherein A and B exist in two immiscible phases I and II, which comprises dissolving Y quantity of A and X quantity of B in a volatile liquid, thereby rapidly and homogeneously mixing A and B, removing the liquid by evaporation, leaving a non-volatile phase II containing X and Y, adding a specific volume of phase I, immiscible with phase II, and holding the temperature at $T_s$, the temperature at which the specific volume of phase I is just saturated by the amount Y, then removing an aliquot of phase I for obtaining the physical measurement, $R_f$, which is related to the amount of A in phase I, then determining X from the equation $$X = Y \left(\frac{R_i}{R_f} - 1\right)$$

where Y is known by preparation and $R_i$ is the initial measurement of Y amount of A or a calibration curve of $R_f$ vs. X.

7. The method of claim 6 wherein phase I is a liquid and phase II is a solid.

8. The method of claim 6 wherein form A is radioactive and form B is non-radioactive.

9. The method of claim 6 whereby Y amount of radioactive A is dissolved in a volatile liquid solvent containing X amount of B, so that A and B are homogeneously mixed, followed by evaporation of the solvent to leave a solid residue (phase II) containing X and Y, followed bb the addition of a specific volume of liquid (phase I) which just saturates with the quantity Y at temperature, $T_s$, and holding the temperature at $T_s$ until phase I is saturated with Y, followed by the removal of an aliquot of phase I to determine the amount of radioactivity = $R_f$, whereby X is then determined from the equation $$X = Y \left(\frac{R_i}{R_f} - 1\right),$$

Y being known by preparation and $R_i$ being the initial value of radioactivity of Y amount of A, or by referring to a calibration plot of $R_f$ vs. X.

10. A method of analyzing for a chemical substance, which chemical substance is capable of existing in two analytically distinguishable forms, and wherein said chemical substance can exist in two separable phases and is also soluble in a solvent to form a saturated solution comprising the steps of:

providing a saturated solution of a known amount of said chemical substance in the first of said two analytically distinguishable forms, said solution constituting a first phase of said chemical substance providing an unknown amount of said chemical substance in a second phase which is separable from said first phase, said chemical substance being in the second of said two analytically distinguishable forms contacting said saturated solution with the said unknown amount of said chemical substance maintaining such contact until equilibrium is reached at constant temperature in the distribution of the first and second analytically distinguishable forms of the substances between the saturated solution and the second phase separating said second phase from the saturated solution analytically determining the quantity of said chemical substance in its first analytically distinguishable form which remains in said saturated solution or in said second phase and determining said unknown amount of said chemical substance by correlation with said last analytically determined amount.

11. A method of analyzing for a chemical substance contained in a medium, which chemical substance is capable of existing in a radioactive and non-radioactive form, and wherein said chemical substance can exist in a single solid phase and is also soluble in a solvent to form a saturated solution, comprising the steps of:

providing a saturated solution of a known amount of said chemical substance in its radioactive form at a predetermined temperature providing a known amount of said medium which contains an unknown amount of said chemical substance in its non-radioactive form and forming a solid phase of said chemical substance from said known amount of medium which contacting said saturated solution with said solid phase maintaining said contact until equilibrium is reached at said predetermined temperature in the distribution of the radioacitve and non-radioactive forms of the substance between the saturated solution and the solid phase separating said solid phase from the saturated solution analytically determining the quantity of said chemical substance in its radioactive form which remains in said saturated solution or in said solid phase and determining said unknown amount of said chemical substance which was contained in said medium by correlation with said last analytically determined amount.

12. The method of claim 11 wherein the temperature of said saturated solution in contact with said solid phase is first raised to at least partially dissolve said solid phase and the temperature is then lowered to said predetermined temperature.

13. A method of analyzing for a chemical substance contained in a medium, which chemical substance is capable of existing in a radioactive and non-radioactive form, and wherein said chemical substance can exist in a single solid phase and is also soluble in a solvent to form a saturated solution, comprising the steps of:

providing a saturated solution of a known amount, Y, of said chemical substance in its radioactive form at a predetermined temperature measuring the radioactivity, $R_i$, of said saturated solution providing a known amount of said medium which contains an unknown amount, X, of said chemical substance in its nonradioactive form forming a solid phase from said known amount of medium which contains X, contacting said saturated solution with said solid phase maintaining said contact until equilibrium is reached at said predetermined temperature in the distribution of the radioactive and non-radioactive forms of the substance between the saturated solution and the solid phase separating said solid phase from the saturated solution measuring the radioactivity, $R_f$, of said separated saturated solution and determining said unknown amount of said chemical substance which was contained in said medium in accordance with the following relationship $$X = Y \left( \frac{R_i}{R_f} - 1 \right).$$

* * * * *